United States Patent [19]
Liebermann et al.

[11] Patent Number: 5,321,209
[45] Date of Patent: Jun. 14, 1994

[54] ELECTRONIC WEIGHING DEVICE

[75] Inventors: Leonard Liebermann, LaJolla; Philip Salzmann, Leucadia, both of Calif.

[73] Assignee: TIF Instruments, Inc., Miami, Fla.

[21] Appl. No.: 994,609

[22] Filed: Dec. 17, 1992

[51] Int. Cl.$^5$ .......................... G01G 3/14; G01L 1/22
[52] U.S. Cl. .......................... 177/210 C; 177/210 FP; 73/862.638
[58] Field of Search ............ 177/210 C, 210 FP, 211, 177/229; 73/862.636–862.642

[56] References Cited

U.S. PATENT DOCUMENTS

| | | | |
|---|---|---|---|
| 3,332,506 | 7/1967 | Bradfield | 177/210 R |
| 3,418,850 | 12/1968 | Goddin | 73/862.625 |
| 3,595,329 | 7/1971 | Withnell | 177/210 FP |
| 3,713,333 | 1/1973 | MacGeorge | 73/862.638 |
| 4,836,314 | 6/1989 | Rupprecht et al. | 177/210 FP |
| 5,109,707 | 5/1992 | VanGerpen | 73/862.637 |

Primary Examiner—George H. Miller, Jr.

[57] ABSTRACT

A spring structure for a weight scale is described which is assembled from four extruded aluminum parts. The structure readily lends itself to the addition of a platform for placing weights and its deflection resulting from a weight is essentially invariant to the location of the weight on the platform. The sensor which converts deflection of the structure into an electrical signal includes two conducting plates, attached to the structure, which constitute a variable capacitor. The variable capacitor is part of a self-excited oscillator circuit which yields a frequency which is accurately related linearly to the value of the weight. Means are provided for distorting one of the capacitor plates to provide further improvement of invariance to weight location on the platform.

11 Claims, 4 Drawing Sheets

5,321,209

ELECTRONIC WEIGHING DEVICE

FIELD OF THE INVENTION

The present invention relates to weighing scales for determining the weight of an object placed on the scale. More particularly the present invention relates to a weighing scale which employs electronic means to present the value of the weight in digital form.

BACKGROUND OF THE INVENTION

Electronic weighing scales typically present the value of a weight on an electronic digital display. The latter is convenient to read and potentially capable of reading with high accuracy.

Electronic weighing scales are commercially available for a wide variety of applications; employed for weighing small weights (less than 1 gram) as well as for applications involving weights exceeding many tons. The sensor which converts the value of the weight to an electrical signal can either sense the deflection of a spring structure by an added weight, or alternatively can sense the strain in a relatively stiff spring structure by the added weight.

An important aspect of the design of the spring structure and its associated sensor is the elimination of variations of apparent weight related to the weight location on the weighing platform. This weighing error is typically reduced or eliminated in commercial designs by employing a cantilevered spring structure.

Commercial sensors for transforming spring deformation into an electrical signal are of two types depending upon whether strain or deflection of the spring structure is being sensed. Sensors employed in prior designs utilizing deflection of the spring structure are typically either the variable differential transformer or variable capacitance means; the typical sensor for measuring strain in the spring structure is the conventional strain gauge.

SUMMARY OF THE INVENTION WITH OBJECTS

The general object of this invention is to make a spring structure for a weighing scale whose deflection is a measure of the weight on its weighing platform.

A related specific object is to design the spring structure so its deflection does not depend upon the location of the weight on the weighing platform.

Another object is to design a spring structure which can be constructed of molded parts in order to avoid the expense of precision machined parts.

A further object is to employ a deflection sensor which is simple to construct, precise, but rugged, and able to contribute additional correction of variation arising from weight location on the platform.

A further specific object is to make an electronic oscillator for this deflection sensor which ensures that the output signal is a precisely linear function of the deflection over a wide range of weights.

In accordance with the principles of this invention, a spring structure is constructed from four identical sections of an extrusion. Each section constitutes a leaf spring. These four leaf springs are fastened together to form an integral self-supporting spring structure.

A platform is fastened to the central portion of the spring structure to support the weight to be tested. The deformation of the structure by the weight on the platform is linearly proportional to the value of the weight. Weighing error resulting from the location of the weight on the platform is nearly eliminated by the symmetry of the structure, rather than by the cantilevered systems employed for this purpose previously.

Deformation is converted to an electrical signal for measurement and display by means of a variable capacitor which is incorporated and integral with the spring structure. The capacitor is part of an oscillator circuit which specifically compensates for error introduced by stray capacitance. The capacitor incorporates means for bending portions of one electrode plate for additional compensation for error caused by weight location on the platform.

In one specific aspect of the invention the spring structure employs four identical pieces of an aluminum extrusion which are welded together. The structure together with its associated variable capacitor is accurately able to read weight up to 150 pounds with a weight resolution of 0.5 ounce. The maximum positional error is less than 1%.

These and other objects, features, and advantages of the present invention will be more fully understood and appreciated by those skilled in the art upon consideration of the following detailed description of a preferred embodiment, presented together with drawings.

DETAILED DESCRIPTION OF A PREFERRED EMBODIMENT

Figure 1:
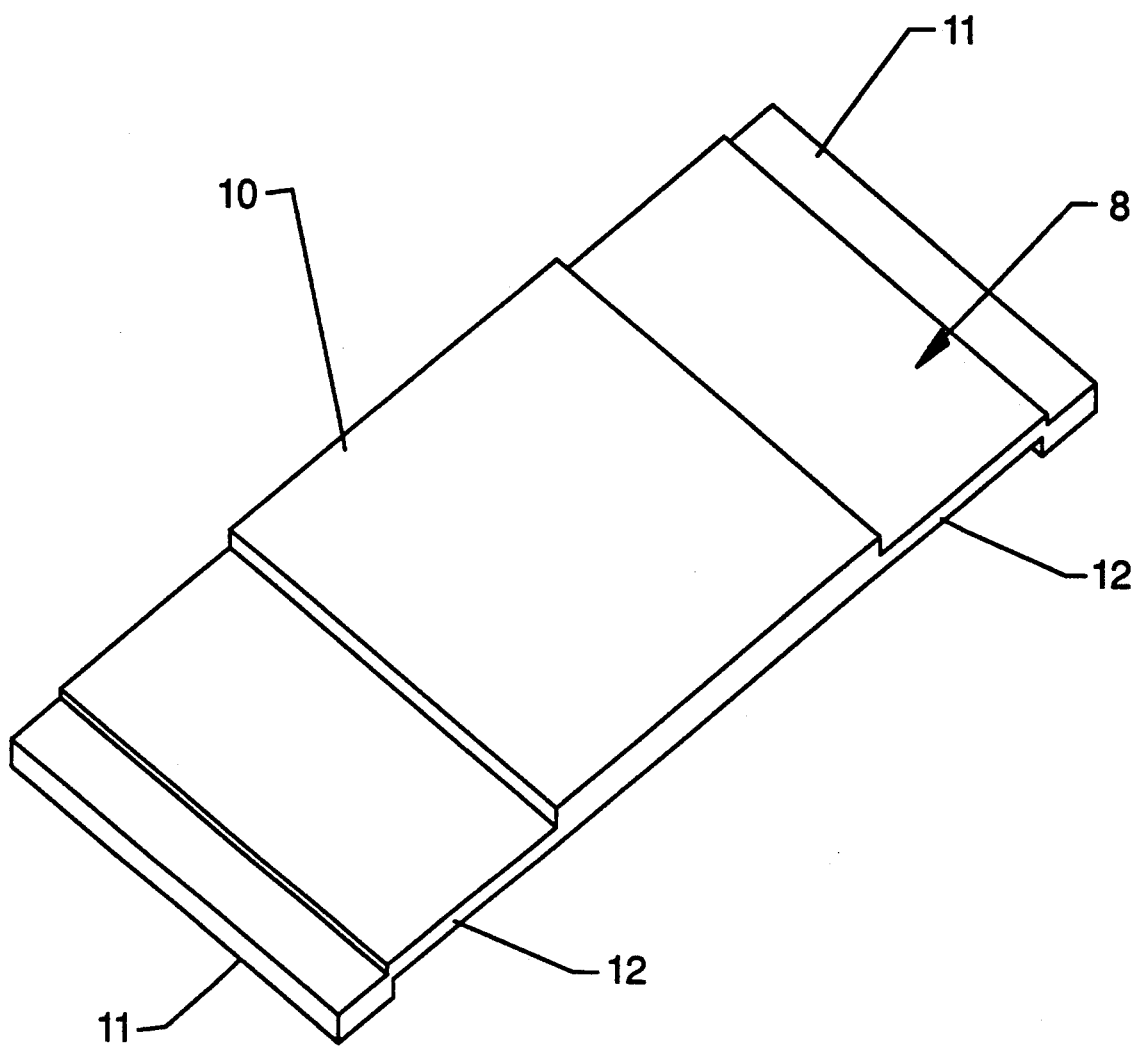
FIG. 1 is a three dimensional view of one of the four identical sections of the extrusion which are fastened together to make the spring structure.

With reference to FIG. 1, one of the four identical sections of an aluminum extrusion is shown and generally designated as 8. Each section 8 comprises a leaf spring having a stepped cross sectional configuration. This symmetrical cross sectional configuration includes a thick center portion 10, end portions 11, and thin intermediate portions 12. In these cross sections, the thin portions 12 are essentially responsible for deflection with negligible flexing in the thick portions 10 and 11. By way of example, but not a limitation, the overall length is about 7 inches. The thickness of the center portion 10, and the end supports 11, is about 3/16 inch. The lengths of center portion 10 and end portions 11 are about 3 inches and ½ inches, respectively. A suitable material for constructing the section 8 is an aluminum alloy 6061 or alternatively, 6063, tempered to T6 hardness. The thin deformable portions 12, are about 0.045 inches thick. The length of the deformable portion 12 is approximately 1.5 inches. Preferably, the width of the cut extrusion should be slightly less than the length of 10, or approximately 2.9 inches.

Figure 2A:
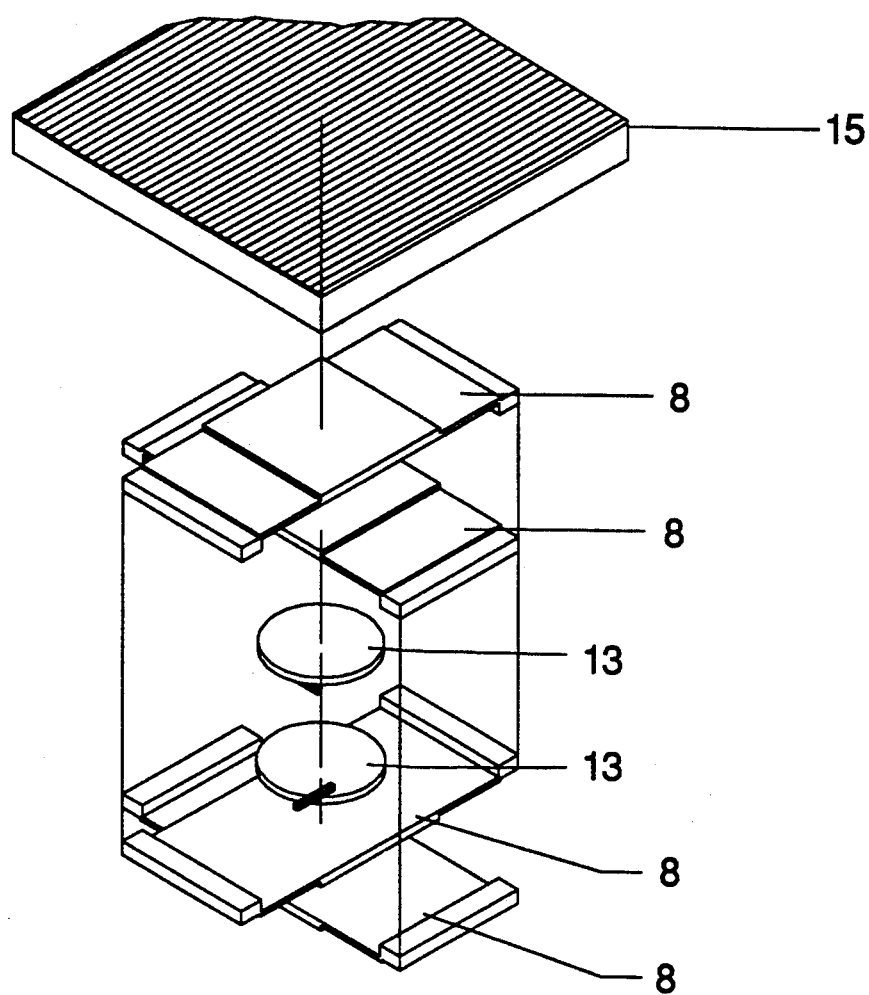
FIG. 2A illustrates how the four sections of the extrusion and the platform are assembled, including the two capacitor electrodes.
Figure 2B:
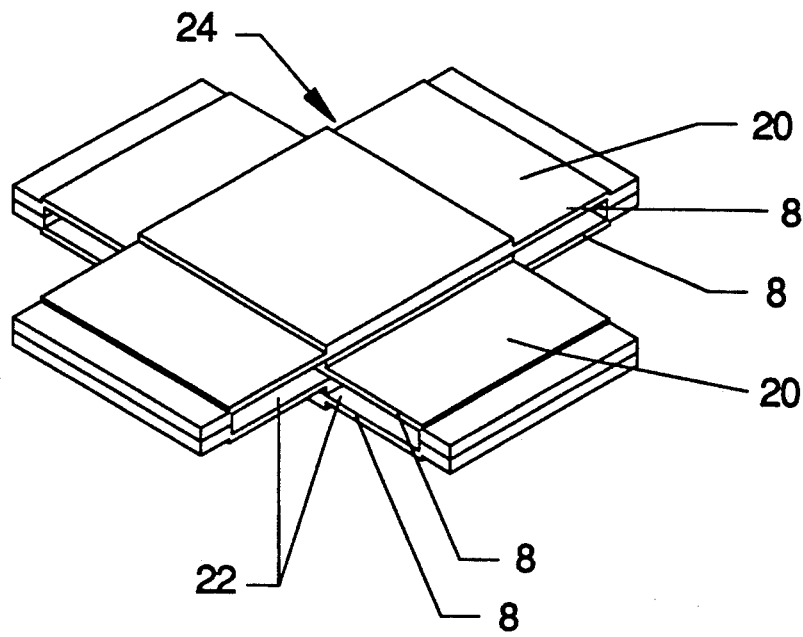
FIG. 2B shows the assembled spring structure (without the platform).

As shown in FIGS. 2A and 2B, two of these sections 8 fastened together in opposition at each end support 11 form a compound leaf spring pair 20 with a centrally located air gap 22. This compound configuration (i.e. leaf spring pair 20) is preferable to a single leaf section 8 because the spring deflection is more linearly proportional to a weight applied normal to the central portion. However a compound leaf spring pair formed of two sections 8 is subject to deflection error if the weight is applied off axis. Hence another substantially identical leaf spring pair is attached along a common center and with a common gap, and generally perpendicularly to the leaf spring pair to form a generally X-shaped spring structure. This more symmetrical spring structure 24 provides essential correction of error resulting from off-axis weight application as well as offering support for an added platform 15 (FIG. 2A). Off-axis weight application will occur with location of weight off-center on a weighing platform, but without error therefrom.

FIG. 2A illustrates the procedure for assembling the four extruded sections 8 together with a platform 15 and two circular electrodes 13 into a spring structure 24, while FIG. 2B shows the completed X-shaped spring structure 24 (with the platform 15 omitted). The platform can be circular or square, constructed of metal, plastic or wood. By way of example a square platform 15 is approximately 9 inches on a side. The two insulated circular electrodes 13 constitute a capacitor which is integral with the structure, with capacitance varying with spring deflection. Commercially available circuit board material is suitable for electrodes. The four parts 20, 20, 13, 13 are held together by welding, rivets, or screws. A welded structure is preferred in order to eliminate microscopic movement at the joints. A structure held by screws may show errors in linearity, or exhibit failure to return precisely to "zero" when weight is removed.

Figure 3:
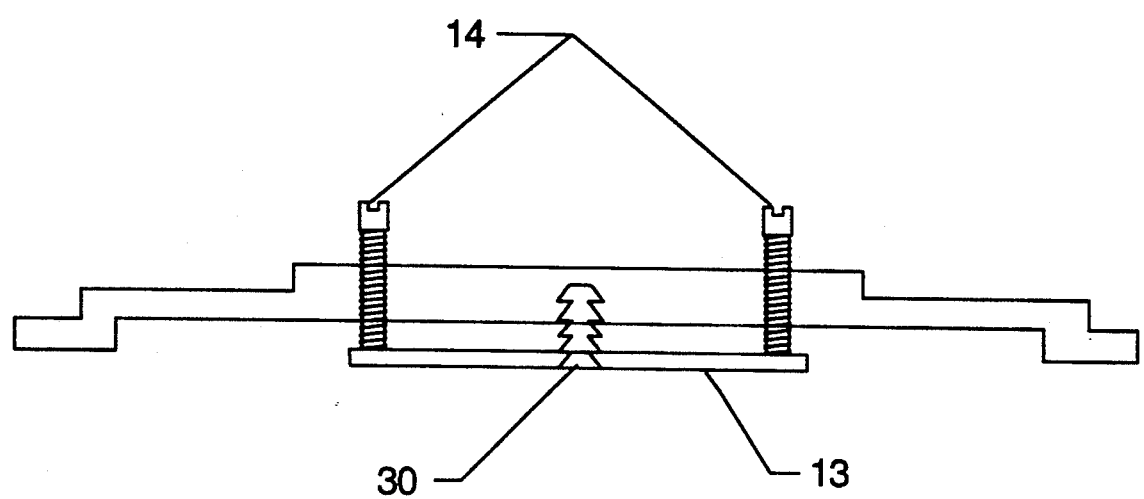
FIG. 3 is a cross-sectional view of one section of the spring structure to show the moveable electrode of the capacitor. By tilting and bending the electrode with the adjustment screws, weight location errors can essentially be eliminated.

While the symmetrical X-shape of the spring structure 24 should eliminate variation in deflection resulting from the weight location on the platform, small weighing error is occasionally found in some assembled springs. This residual error is believed to be the result of minor variations in elasticity and shape within each extruded section 8. It is preferable to provide means for further correction of any residual weighing errors associated with weight location. Referring to FIG. 3, one of the two circular electrodes 13 can be tilted or bent out of its plane by adjusting screws 14. In this manner the uniformity of the spacing between the two circular electrodes 13 can be altered. Changes in the uniformity of spacing of the circular electrodes 13 alters the electrical signal and leads to error correction. The circular electrode 13 can be fastened by a single centrally located screw 30; the center remains fixed and the periphery of the circular electrode 13 is slightly depressed by four symmetrically located adjustment screws 14. Although the screw heads of adjusting screws 14 are shown here exposed, after assembly they can be covered by another extrusion section 8 as well as by the platform 15. Both latter parts have clearance holes for screws 14, offering access for screwdriver adjustment. During adjustment any trial weight (e.g. 5 lbs) is repeatedly tested at the platform center and at four equally spaced locations at the periphery with adjustment continued until all weight variation is removed. The adjustment is sensitive, requiring fine threads for the adjusting screws 14. Once the correction is installed there is no need for any subsequent adjustment.

Figure 4:
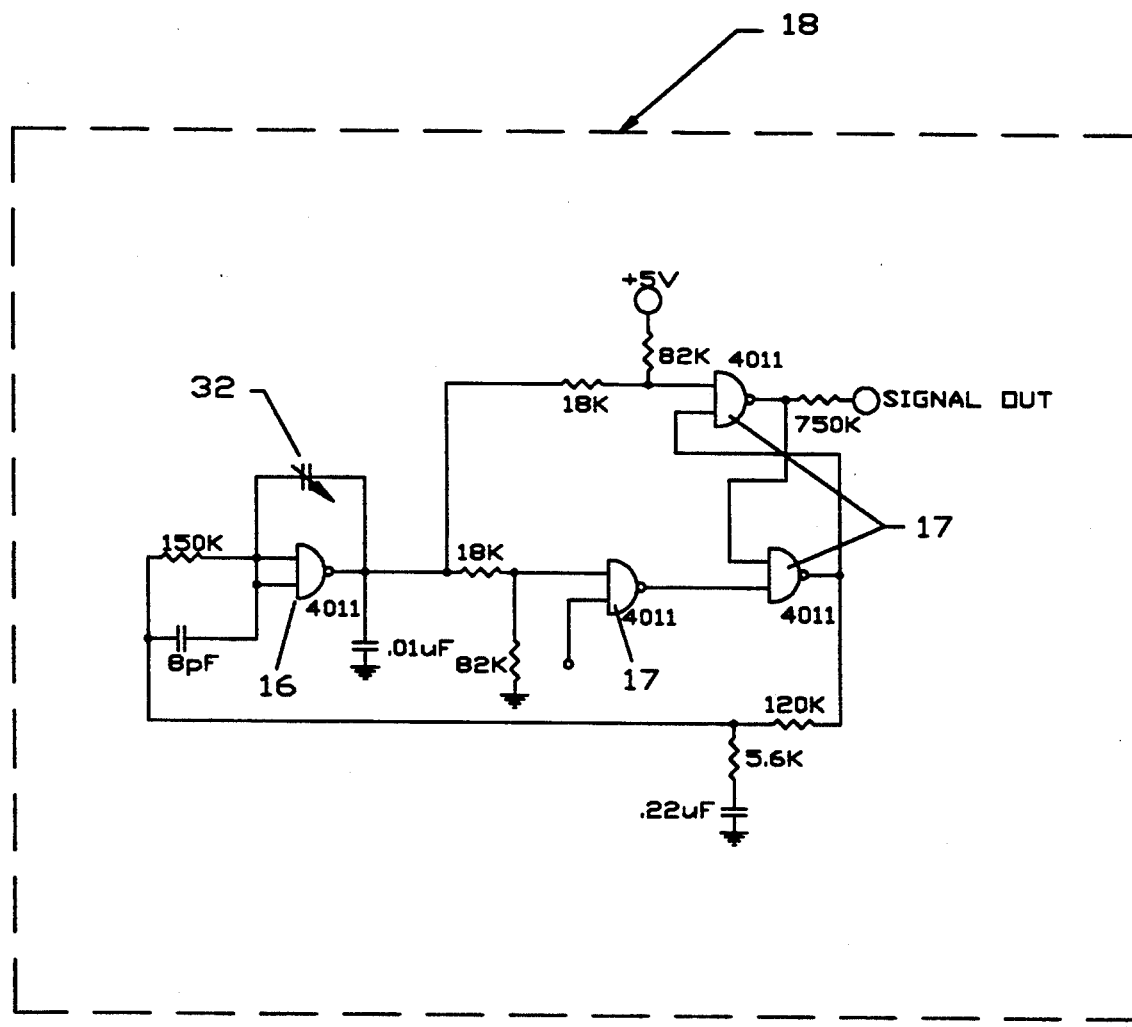
FIG. 4 is an electrical schematic oscillator circuit diagram for a weighing device constructed in accordance with principles of the present invention.

FIG. 4 is the schematic electronic oscillator circuit 18 for use with the two electrodes 13 which constitute a variable capacitor in an oscillator circuit. The oscillator circuit operates in the following manner: When the capacitor 32 is in the negative feedback circuit of amplifier 16 the amplifier functions as an integrator and its output is the time intgral of the input voltage. In the preferred oscillator circuit, a 4011 CMOS NAND gate 16 conveniently serves as a feedback amplifier/integrator 16 in the manner shown. The output from the amplifier/integrator 16 is connected to a Schmitt trigger 17, constructed of three NAND gates. The trigger output consists of constant amplitude square waves which are input to the integrator 16. In this manner the oscillator circuit 18 becomes a self-excited oscillator whose frequency is (inversely) proportional to the weight. This oscillator circuit 18 removes nonlinearity error resulting from stray capacitance between the electrodes 13 (FIG. 2A) and the grounded aluminum structure 24 (FIG. 2B) and the frequency is accurately a linear function of electrode spacing.

With the component values of FIG. 4 the frequency of oscillation varies from approximately 15 to 25 kilohertz depending upon the weight; one ounce produces a frequency change of about 10 hertz which is easily read and displayed by conventional circuitry. If desired, conventional circuitry can convert the frequency signal to read in pounds or in kilograms.

To those skilled in the art to which the present invention pertains, many widely differing embodiments will be suggested by the foregoing without departing from the spirit and scope of the present invention. The descriptions and disclosures herein are intended solely for purposes of illustration and should not be construed as limiting the scope of this invention which is more particularly pointed out by the following claims.

What is claimed is:

1. An electronic weighing device comprising:
   a first compound leaf spring member constructed of two sections fastened together at each end with a gap therebetween;
   a second substantially identical compound leaf spring member attached to the first leaf spring member along a common center and with a common gap, along an axis perpendicular to the first spring member to form an elastic structure which deflects upon application of a weight;
   a platform attached to the elastic structure; and
   means for sensing the deflection of the leaf spring members upon application of a weight to the platform.

2. The electronic weighing device as claimed in claim 1 and wherein the means for sensing the deflection is a pair of electrodes mounted in the gap in the leaf spring members to form a capacitor.

3. The electronic weighing device as claimed in claim 2 and further comprising means for adjusting the uniformity of the spacing between said electrodes for correcting weighing errors arising from a location of a weight on the platform.

4. The electronic weighing device as claimed in claim 3 and wherein the first and second spring members form a nestable generally x-shaped structure.

5. An electronic weighing device comprising:

a first leaf spring member formed of two sections having a gap therebetween and deflectable towards one another;

a second leaf spring member formed of two sections having a gap therebetween and deflectable towards one another with the second leaf spring member connected to the first leaf spring member to form a generally x-shaped elastic structure;

a platform attached to the elastic structure; and means for sensing a deflection of the leaf spring members upon application of a weight to the platform and for producing a signal proportional to the amount of the deflection.

6. The electronic weighing device as claimed in claim 5 and wherein the sensing means includes two electrodes mounted between the leaf spring members to form a variable capacitor.

7. The electronic weighing device as claimed in claim 6 and further comprising electrical oscillator circuit means connected to the electrodes and including an oscillator circuit to compensate for error introduced by stray capacitance.

8. The electronic weighing device as claimed in claim 7 and wherein the unformity of the gap between said electrodes is adjustable to compensate for errors arising from a location of a weight on the platform.

9. An electronic weighing device for weighing an object comprising:

an elastic structure including a first compound leaf spring and a second compound leaf spring attached together along a common center and at right angles to one another with each leaf spring formed of symmetrical upper and lower sections attached at each end and shaped to form a gap therebetween;

deflection sensing means including two planar electrodes in the gap between the compound leaf springs for forming an electrical signal proportional to the weight of an object which deflects the elastic structure; and oscillator circuit means associated with the planar electrodes for generating an electrical signal that is linearly proportional to the spacing between the electrodes.

10. The weighing device as claimed in claim 9 and wherein the upper and lower sections of the leaf springs are each formed with a center section which is thicker than end portions of the leaf spring sections.

11. The weighing device set forth in claim 9, wherein means for adjusting the uniformity of the spacing between said electrodes corrects for weighing error resulting from location of weight on said platform.

* * * * *